(12) United States Patent
Andou et al.

(10) Patent No.: US 8,053,015 B2
(45) Date of Patent: Nov. 8, 2011

(54) HARD FAT

(75) Inventors: Masataka Andou, Yokosuka (JP); Yoshiyuki Hatano, Yokosuka (JP); Hirofumi Haruna, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 12/992,069

(22) PCT Filed: Apr. 17, 2009

(86) PCT No.: PCT/JP2009/057736
§ 371 (c)(1),
(2), (4) Date: Nov. 10, 2010

(87) PCT Pub. No.: WO2009/139266
PCT Pub. Date: Nov. 19, 2009

(65) Prior Publication Data
US 2011/0059221 A1 Mar. 10, 2011

(30) Foreign Application Priority Data
May 15, 2008 (JP) .................. 2008-128861

(51) Int. Cl.
*A23D 9/00* (2006.01)
(52) U.S. Cl. .................. 426/607; 426/601
(58) Field of Classification Search ......... 426/601–607
See application file for complete search history.

(56) References Cited

U.S. PATENT DOCUMENTS

| | | | |
|---|---|---|---|
| 4,610,889 A | 9/1986 | Schmidt | |
| 5,268,191 A * | 12/1993 | Crosby | 426/606 |
| 5,786,019 A | 7/1998 | Cain et al. | |
| 2008/0206413 A1 * | 8/2008 | Fine et al. | 426/297 |
| 2009/0022868 A1 * | 1/2009 | Van Den Bremt et al. | 426/565 |
| 2009/0246348 A1 * | 10/2009 | Huizinga et al. | 426/603 |
| 2009/0263559 A1 * | 10/2009 | Van Horsen et al. | 426/606 |

FOREIGN PATENT DOCUMENTS

| | | |
|---|---|---|
| JP | 4713607 A | 7/1972 |
| JP | 4832164 A | 10/1973 |
| JP | 57074041 A | 5/1982 |
| JP | 60180542 A | 9/1985 |
| JP | 9501465 A | 2/1997 |
| JP | 2001262181 A | 9/2001 |

OTHER PUBLICATIONS

Young, F. 1983. JAOCS 60(2)374-379 (326A-331A).*
Rossell, J. B. 1985. JAOCS 62(2)221-230.*
Kuksis, A. et al. 1964. JAOCS 41(3)201-205.*
Lida, H. M. D. Norr et al. 2002. JAOCS 79(11)1137-1144.*
Authorized Officer (unknown), International Search Report/Written Opinion in PCT/JP2009/057736, mailed Jul. 21, 2009.

* cited by examiner

*Primary Examiner* — Carolyn Paden
(74) *Attorney, Agent, or Firm* — Fish & Richardson P.C.

(57) ABSTRACT

Disclosed is a hard fat which can be a basic ingredient for obtaining a margarine or shortening having favorable meltability in the mouth of a lauric fat, and also having favorable plasticity, as well as a margarine or shortening in which the hard fat is used, and confectioneries and breads using the same are provided. A hard fat containing 25 to 45% by mass of a lauric acid, having an iodine value of 0 to 25, and having the following triglyceride composition: triglycerides (CN 32 to 54 TG) of 85 to 100% by mass; triglycerides (CN 32 to 38 TG) of 30 to 50% by mass; triglycerides (CN 40 to 46 TG) of 25 to 55% by mass; triglycerides (CN 48 to 54 TG) of 10 to 30% by mass, and further having the following constituent triglyceride ratio: ((CN 32 to 38 TG)/(CN 40 to 46 TG)) of 0.5 to 1.5; ((CN 32 to 38 TG)/(CN 48 to 54 TG)) of no less than 1.0; and ((CN 40 to 46 TG)/(CN 48 to 54 TG)) of no less than 1.0.

7 Claims, No Drawings

HARD FAT

TECHNICAL FIELD

The present invention relates to a hard fat prepared taking advantage of superior meltability of a lauric fat in the mouth, and margarines or shortenings produced using the hard fat.

BACKGROUND ART

Lauric fats that are rich in lauric acid typified by coconut oil and palm kernel oil are fats having a bland taste and superior meltability in the mouth, and have been conventionally used as a basic ingredient of oily foods such as chocolates, margarines, shortenings, whipped creams, and ice creams. When a lauric fat is used as a raw fat material of margarines or shortenings, the amount thereof which may be blended is limited since it is disadvantageous in a narrow temperature range that enables appropriate plasticity as a trade-off for superior meltability in the mouth to be provided. Consequently, there exists a dilemma of failure in sufficiently taking advantage of superior meltability in the mouth.

In attempts to make a temperature range broader that enables provision of appropriate plasticity while maintaining superior meltability of a lauric fat in the mouth, techniques of transesterifying a lauric fat and a solid fat including a saturated fatty acid having 16 or more carbon atoms have been known (for example, Patent Documents 1 and 2). However, although transesterified fats/oils themselves have favorable meltability in the mouth according to these techniques, meltability in the mouth peculiar to the lauric fat has not yet been exploited satisfactorily under current situations as this meltability is diffused when blended as a basic ingredient of margarines or shortenings with a liquid oil or the like.

In addition, puff pastry margarine in which purity of a triglyceride such as trilaurin or trimyristin is improved, and which has a property exhibiting favorable plasticity up to around 35° C., but which melts rapidly at body temperature was also proposed (for example, Patent Document 3). However, the technique proposed in Patent Document 3 necessitates ester synthesis for increasing the content of lauric acid and myristic acid in triglyceride constituent fatty acids to no lower than 90% by mass (hereafter, "%" as referred to herein indicates "% by mass"), and is thus economically disadvantageous due to difficulty according to processing techniques such as fractionation and transesterification carried out using a natural raw fat material.

Therefore, margarines and shortenings having favorable plasticity, and exploiting properties of a lauric fat have not yet been provided.
Patent Document 1: Japanese Unexamined Patent Application, Publication No. S47-13607
Patent Document 2: Japanese Unexamined Patent Application, Publication No. S57-74041
Patent Document 3: Japanese Examined Patent Application, Publication No. S48-32164

DISCLOSURE OF THE INVENTION

Problems to be Solved by the Invention

An object of the invention is to develop a hard fat which can be a basic ingredient for obtaining a margarine or shortening having favorable meltability in the mouth of a lauric fat, and also having favorable plasticity. Other object of the invention is to provide a margarine or shortening having favorable plasticity and favorable meltability of a lauric fat in the mouth by using the hard fat, and confectioneries and breads using the same.

Means for Solving the Problems

The present inventors thoroughly investigated in order to solve the aforementioned problems, and consequently found that the problems can be solved by using a lauric fat, and processing and preparing so as to have a certain triglyceride composition. Accordingly, the present invention was accomplished.

More specifically, a first aspect of the present invention provides a hard fat containing 25 to 45% by mass of a lauric acid, having an iodine value of 0 to 25, and having the following triglyceride composition:

triglycerides having a total number of carbon atoms of the constituent fatty acid residues of 32 to 54 (CN 32 to 54 TG) being 85 to 100% by mass;

triglycerides having a total number of carbon atoms of the constituent fatty acid residues of 32 to 38 (CN 32 to 38 TG) being 30 to 50% by mass;

triglycerides having a total number of carbon atoms of the constituent fatty acid residues of 40 to 46 (CN 40 to 46 TG) being 25 to 55% by mass; and triglycerides having a total number of carbon atoms of the constituent fatty acid residues of 48 to 54 (CN 48 to 54 TG) being 10 to 30% by mass, the mass ratio of the triglycerides having a total number of carbon atoms of the constituent fatty acid residues of 32 to 38 to the triglycerides having a total number of carbon atoms of the constituent fatty acid residues of 40 to 46 ((CN 32 to 38 TG)/(CN 40 to 46 TG)) being 0.5 to 1.5;

the mass ratio of the triglycerides having a total number of carbon atoms of the constituent fatty acid residues of 32 to 38 to the triglycerides having a total number of carbon atoms of the constituent fatty acid residues of 48 to 54 ((CN 32 to 38 TG)/(CN 48 to 54 TG)) being no less than 1.0; and the mass ratio of the triglycerides having a total number of carbon atoms of the constituent fatty acid residues of 40 to 46 to the triglycerides having a total number of carbon atoms of the constituent fatty acid residues of 48 to 54 ((CN 40 to 46 TG)/(CN 48 to 54 TG)) being no less than 1.0.

A second aspect of the present invention provides the hard fat according to the first aspect, prepared by mixing a fat A: a lauric fat containing 35 to 65% by mass of lauric acid and having an iodine value of 0 to 30 with a fat B: a transesterified lipid that contains 12 to 34% by mass of lauric acid and 45 to 75% by mass of a saturated fatty acid having 16 or more carbon atoms and has an iodine value of 0 to 20, the mixing ratio of the fat A to the fat B being 30:70 to 75:25.

A third aspect of the present invention provides the hard fat according to the second aspect, in which the fat A which is a lauric fat containing 35 to 65% by mass of lauric acid and having an iodine value of 0 to 30 is a fat/oil derived from coconut oil.

A fourth aspect of the present invention provides the hard fat according to the second aspect, in which the fat A which is a lauric fat containing 35 to 65% by mass of lauric acid and having an iodine value of 0 to 30 is a transesterified lipid.

A fifth aspect of the present invention provides a fat/oil composition prepared by mixing the hard fat according to any one of the first to fourth aspects of the invention with a liquid fat/oil at a ratio of 10:90 to 90:10.

A sixth aspect of the present invention provides a margarine or shortening including the fat/oil composition according to the fifth aspect as an oil phase.

A seventh aspect of the present invention provides the margarine or shortening according to the sixth aspect for use in spreading or rolling-in.

An eighth aspect of the present invention provides a food in which the margarine or shortening according to the sixth or seventh aspect is used.

Effects of the Invention

By using the hard fat of the present invention to prepare a margarine or shortening, a margarine or shortening can be obtained having favorable meltability in the mouth accompanied by feel of coolness of a lauric fat, being superior in shape retainability and structural state (texture), and having favorable plasticity. In particular, by using in applications such as spreading and rolling-in that are greatly influenced by physical properties of the fat/oil, a spread having favorable meltability in the mouth accompanied by feeling of coolness as well as favorable shape retainability and structural state (texture), and a roll-in margarine having good spreadability and favorable lift of the pastry dough can be produced. In addition, pies, Danish pastries and croissants using the same having light texture and favorable meltability in the mouth can be provided.

In general, a margarine or shortening exhibits inferior shape retainability when the meltability in the mouth is favorable, whereas inferior meltability in the mouth is provided when the shape retainability is favorable. However, by using the hard fat of the present invention, a margarine or shortening can be prepared which concurrently has well-balanced meltability in the mouth and shape retainability.

PREFERRED MODE FOR CARRYING OUT THE INVENTION

Hereinafter, the present invention is explained in detail.

The hard fat of the present invention is a fat that is suited for plastic fat/oil foods typified by margarines and shortenings and that is a solid at room temperature (25° C.), and imparts appropriate hardness and stickiness to plastic fat/oil foods.

The hard fat of the present invention contains 25 to 45% by mass of lauric acid as a fatty acid that constitutes the fat, and has an iodine value of 0 to 25. The lauric acid content and the iodine value falling within the above range are preferred since favorable meltability in the mouth accompanied by feel of coolness, and shape retainability as a hard fat are likely to be achieved.

The lauric acid content of the hard fat of the present invention is 25 to 45% by mass, preferably 31 to 41% by mass, and more preferably 33 to 39% by mass. In addition, the iodine value is 0 to 25, preferably 0 to 15, and more preferably 0 to 10.

The hard fat of the present invention contains as essential constituent components, three triglyceride fractions of: triglycerides having a total number of carbon atoms of the constituent fatty acid residues of 32 to 38 (CN 32 to 38 TG); triglycerides having a total number of carbon atoms of the constituent fatty acid residues of 40 to 46 (CN 40 to 46 TG); and triglycerides having a total number of carbon atoms of the constituent fatty acid residues of 48 to 54 (CN 48 to 54 TG).

The (CN 32 to 38 TG) is a component that predominantly imparts cool meltability in the mouth, and a synthesized product may be used, but this component is suitably one included in coconut oil and palm kernel oil that are natural fats/oils, and processed oils thereof (lauric fat, generally referred to).

In addition, the (CN 40 to 46 TG) is a component that predominantly regulates fat/oil crystals, whereas the (CN 48 to 54 TG) is a component that predominantly serves in maintaining the structure. Any synthesized product may be used therefor, but the components are suitably one included in a fat/oil obtained by transesterification of a lauric fat and a fat/oil that is constituted with a saturated fatty acid having 16 or more carbon atoms and that is rich in triglycerides (for example, a palm stearin, a fully hydrogenated oil of a non-lauric fat, and the like).

It is necessary that the hard fat of the present invention is prepared such that with respect to each of the aforementioned triglyceride fractions: the (CN 32 to 38 TG) accounts for 30 to 50% by mass; the (CN 40 to 46 TG) accounts for 25 to 55% by mass and the (CN 48 to 54 TG) accounts for 10 to 30% by mass; and the total of the three triglyceride fractions (i.e., CN 32 to 54 TG) accounts for 85 to 100% by mass. When the contents of the (CN 32 to 38 TG), the (CN 40 to 46 TG) and the (CN 48 to 54 TG), and the content of the (CN 32 to 54 TG) fall within the above range, a fat/oil composition, or a margarine or shortening in which the hard fat of the present invention is used is preferred since it has favorable plasticity, favorable meltability in the mouth accompanied by feel of coolness of a lauric fat.

The content of the (CN 32 to 38 TG) is 30 to 50% by mass, and more preferably 34 to 43% by mass. The content of the (CN 40 to 46 TG) is 25 to 55% by mass, and more preferably 30 to 50% by mass. The content of the (CN 48 to 54 TG) is 10 to 30% by mass, and more preferably 15 to 25% by mass.

It is necessary that the hard fat of the present invention satisfies in addition to the requirements of the aforementioned content of each triglyceride fraction, the requirements for constituent ratios between each of the triglyceride fractions that: (CN 32 to 38 TG)/(CN 40 to 46 TG) is 0.5 to 1.5; (CN 32 to 38 TG)/(CN 48 to 54 TG) is no less than 1.0, and (CN 40 to 46 TG)/(CN 48 to 54 TG) is no less than 1.0. To satisfy the aforementioned requirements for the constituent ratios of each of the triglyceride fractions is preferred since the fat/oil composition, or the margarine or shortening in which the hard fat of the present invention is used is likely to have favorable plasticity and to attain favorable meltability in the mouth accompanied by feel of coolness of a lauric fat.

The ratio (CN 32 to 38 TG)/(CN 40 to 46 TG) is 0.5 to 1.5, and more preferably 0.9 to 1.3.

The ratio (CN 32 to 38 TG)/(CN 48 to 54 TG) is no less than 1.0, and more preferably no less than 1.3.

The ratio (CN 40 to 46 TG)/(CN 48 to 54 TG) is no less than 1.0, and more preferably no less than 1.4.

To satisfy the aforementioned requirements for each item of: the lauric acid content as a fatty acid that constitutes the fat; the iodine value; and the content and the constituent ratio of each triglyceride fraction of the hard fat of the present invention is preferred since the fat/oil composition, or the margarine or shortening in which the hard fat of the present invention is used has favorable plasticity and attains favorable meltability in the mouth accompanied by feel of coolness of a lauric fat.

Analysis of triglycerides based on the number of carbon atoms of the constituent fatty acid residues may be carried out according to AOCS Ce5-86 with a gas chromatography process. Moreover, the iodine value may be determined in accordance with a method of "Japan Oil Chemists' Society, Standard Methods for the Analysis of Fats, Oils and Related Materials., 2.3.4.1, 1996".

According to one preferred embodiment of the hard fat of the present invention, the hard fat is obtained by mixing a fat A: a lauric fat containing 35 to 65% by mass of lauric acid as a fatty acid that constitutes the fat and having an iodine value of 0 to 30 with a fat B: a transesterified lipid that contains 12 to 34% by mass of lauric acid and 45 to 75% by mass of a saturated fatty acid having 16 or more carbon atoms and has an iodine value of 0 to 20, the mixing ratio of the fat A to the fat B being 30:70 to 75:25.

The lauric fat that constitutes the fat A is a generic name of fats which are rich in lauric acid that is a saturated fatty acid having 12 carbon atoms as a fatty acid that constitutes the fat. Specific examples of the lauric fat include coconut oil, palm kernel oil, babassu oil, and the like. As the fat A, a fractionated fat obtained by fractionation of a lauric fat, a hardened oil obtained by hydrogenation of a lauric fat, or a transesterified lipid obtained by subjecting each single fat or a mixed fat of lauric fats to a transesterification reaction may be also used. The lauric acid content in the entire constituent fatty acids of the lauric fat that constitutes the fat A is 35 to 65% by mass, and more preferably 45 to 65% by mass. The lauric acid content of the lauric fat falling within the above range is preferred since favorable meltability in the mouth accompanied by feel of coolness peculiar to lauric fat is provided, and due to the triglycerides (CN 32 to 38 TG) contained in an appropriate amount, the triglyceride constitution essential for the hard fat of the present invention can be readily adjusted when blended with the fat B described later.

Specific examples of preferable lauric fat that constitutes the fat A include coconut oil, fractionated hard portions thereof, transesterified lipids constituted with a mixed fat of at least one of the same, and at least one fat selected therefrom. In addition, other preferable specific examples include palm kernel oil, and transesterified lipids constituted with a mixed fat of at least one selected from fractionated hard portions of palm kernel oil.

The transesterified lipid that constitutes the fat B is a transesterified lipid having an iodine value of 0 to 20 and being constituted with 12 to 34% by mass of lauric acid and 45 to 75% by mass of a saturated fatty acid having 16 or more carbon atoms as fatty acids that constitute the transesterified lipid. The lauric acid content of the transesterified lipid is 12 to 34% by mass, and preferably 16 to 28% by mass. The content of the saturated fatty acid having 16 or more carbon atoms in the transesterified lipid is 45 to 75% by mass, and preferably 0 to 70% by mass. The transesterified lipid has an iodine value of 0 to 20, preferably 0 to 15, and more preferably 0 to 13. The transesterified lipid having an iodine value falling within the above range is preferred since the triglycerides (CN 40 to 46 TG) and the triglycerides (CN 48 to 54 TG) are produced with good balance; therefore, the triglyceride constitution essential for the hard fat of the present invention can be readily adjusted when blended with the fat A described above.

Illustrative examples of the transesterified lipid that constitutes the fat B include fats/oils obtained by transesterification of a mixed fat/oil containing two or more kinds of raw fat materials. A hydrogenation treatment for adjusting the iodine value may be carried out as needed. The hydrogenation treatment can be subjected to any one of a raw fat material, a mixed fat/oil containing two or more kinds of raw fat materials (before subjecting to the transesterification treatment), and a fat/oil after subjecting to the transesterification treatment. Hydrogenated oils obtained by subjecting to the hydrogenation refer inclusively to hardened oils and fully hydrogenated oils. The hydrogenation treatment may be carried out under appropriately regulated conditions by persons skilled in the art.

Although the mixed fat/oil containing two or more kinds of raw fat materials is not specifically limited, specific examples thereof include the lauric fats (or hydrogenated oils thereof) as described above in connection with the fat A, and mixed fats/oils with plant fats/oils (or hydrogenated oils thereof) that are rich in fatty acids having 16 or more carbon atoms. Examples of the plant fats/oils that are rich in fatty acids having 16 or more carbon atoms include rape seed oil, soybean oil, palm oil, and the like. In particular, fats/oils containing a lauric fat or a hydrogenated oil thereof (b1) and a palm based fat/oil or a hydrogenated oil thereof (b2), which may include a mixed oil of b1 and b2, and the like may be exemplified.

The lauric fat (b1) is surely acceptable even though it is the same as the lauric fat in connection with the fat A, but the lauric fat having the lauric acid content in the constituent fatty acid of less than 35% by mass can be also used by adjusting the blend ratio with the fat/oil (b2) described later. Illustrative examples of the lauric fat (b1) having the lauric acid content of less than 35% by mass in the constituent fatty acid include highly fractionated soft oils of coconut oil and/or palm kernel oil, and the like. As the lauric fat (b1), any one, or two or more as any combination from among the lauric fats described above in connection with the fat A, highly fractionated soft oils of the lauric fat having a lauric acid content of less than 35% by mass may be used.

As the palm based fat/oil (b2), any one of palm oil and a fractionated oil of palm oil may be used. Specifically, (1) a palm olein and a palm stearin that are first-stage fractionated oils, (2) a palm olein (palm super olein) and palm mid fractions that are fractionated oils (second-stage fractionated oils) of a palm olein, and (3) a palm olein (soft palm) and a palm stearin (hard stearin) that are fractionated oils (second-stage fractionated oil) of a palm stearin, and the like may be exemplified.

The method for fractionating a palm oil is not particularly limited, and any of methods of solvent fractionation, dry fractionation, and emulsification fractionation may be employed. The palm based fat/oil is preferably used after subjecting to full hydrogenation for increasing the content of the saturated fatty acid having 16 or more carbon atoms (i.e., for adjusting the iodine value of the transesterified lipid to 0 to 20). However, the palm stearin having a high content of the saturated fatty acid having 16 or more carbon atoms may be used without subjecting to the full hydrogenation.

As the transesterified lipid that constitutes the fat B, any one in which a fat/oil other than those described above is used is acceptable as long as it includes 12 to 34% by mass of lauric acid, and 45 to 75% by mass of the saturated fatty acid having 16 or more carbon atoms, as the fatty acids that constitute the transesterified lipid, and has an iodine value of 0 to 20.

As one preferable embodiment of the transesterified lipid that constitutes the fat B, for example, a product obtained by transesterification of a mixture of palm kernel oil or a fractionated oil thereof (corresponding to b1 described above) and a palm based fat/oil (corresponding to b2 described above) at a ratio of 30:70 to 70:30, followed by hydrogenation to give an iodine value of no greater than 10. In this case, the palm kernel oil or the fractionated oil thereof, and the palm based fat/oil may be separately hydrogenated first, respectively, and thereafter mixed such that the iodine value becomes no greater than 10 at a mixing ratio of 30:70 to 70:30, followed by transesterification finally. In other words, either transesterification or hydrogenation may be carried out in advance in producing the transesterified lipid.

The iodine value of the transesterified lipid to be subjected to the hydrogenation step is preferably no greater than 10, more preferably no greater than 5, and still more preferably no greater than 2, in terms of allowing the content of the trans fatty acids to be sufficiently decreased.

As another embodiment, transesterified lipids obtained by transesterification of a mixed fat/oil prepared by mixing the palm kernel fully hydrogenated oil and the palm fully hydrogenated oil at a ratio of 50:50 may be exemplified.

As still another preferable embodiment of the transesterified lipid that constitutes the fat B, for example, fats/oils obtained by transesterification of lauric fat having an iodine value of no greater than 10 (corresponding to b1 described above) with a palm based fat/oil having an iodine value of no greater than 20 (corresponding to b2 described above) may be exemplified. As the lauric fat having an iodine value of no greater than 10, for example, fractionated stearin portions of palm kernel oil may be exemplified. The fractionated stearin portion of the palm kernel oil has an iodine value of preferably no greater than 10, and more preferably no greater than 7. As the palm based fat/oil having an iodine value of no greater than 20, fractionated stearin portions of palm oil may be exemplified. As the fractionated stearin portions of palm oil, a second-stage fractionated stearin (hard stearin) obtained by further fractionating a palm stearin provided by first-stage fractionation of palm oil is preferred. The fractionated stearin portions of palm oil have an iodine value of 0 to 20, preferably 0 to 15, and more preferably 0 to 13. Illustrative examples of the transesterified lipid that constitutes the fat B include transesterified lipids obtained by mixing a fractionated stearin of palm kernel oil having an iodine value of no greater than 10 with a palm stearin having an iodine value of no greater than 20 at a mixing ratio of 30:70 to 70:30, and subjecting to transesterification.

With respect to each method for the hydrogenation or the transesterification carried out as needed when the fat A or the fat B is prepared is not particularly limited, and any method generally employed in the art may be used.

In the case of the hydrogenation, for example, the reaction may be allowed in the presence of a nickel catalyst, and under a condition at a hydrogen pressure of 0.02 to 0.3 Mpa and at 160 to 200° C. for 5 min to 2 hrs. After completing the reaction, the catalyst is eliminated by filtration, and thereafter decolorization and deodorization treatments may be carried out which are employed in common purification steps of cooking oils. With respect to the hydrogenation, it is preferred to carry out full hydrogenation to give an iodine value of no greater than 2 in terms of reduction of trans fatty acids about which causal relationships with cardiac diseases are concerned.

In the case of the transesterification, either chemical transesterification or enzymatic transesterification is acceptable. The chemical transesterification is a transesterification reaction which is carried out using a chemical catalyst such as sodium methylate and which is inferior in position specificity (also referred to as "random transesterification"). The chemical transesterification may be carried out, for example, according to a common procedure, by sufficiently drying the raw fat material, adding a catalyst to the raw fat material in an amount of 0.1 to 1% by mass, and thereafter stirring the mixture under reduced pressure, at 80 to 120° C. for 0.5 to 1 hour. After completing the transesterification reaction, the catalyst is washed away with water, and thereafter decolorization and deodorization treatments may be carried out which are employed in common purification steps of cooking oil.

The enzymatic transesterification is carried out using lipase as a catalyst. As the lipase, lipase powder, or immobilized lipase in which lipase powder is immobilized on a carrier such as Celite or an ion exchange resin can be used. The transesterification reaction by the enzymatic transesterification may be either a transesterification reaction that is inferior in position specificity, or a transesterification reaction that is superior in specificity for 1,3-positions, depending on the type of the lipase.

Examples of the lipase capable of carrying out the transesterification reaction that is poor in position specificity include lipase derived from genus Alcaligenes (e.g., lipase QLM, lipase PL, etc., manufactured by Meito Sangyo Co., Ltd.), lipase derived from genus Candida (e.g., lipase OF, etc., manufactured by Meito Sangyo Co., Ltd.), and the like.

Examples of the lipase capable of carrying out the transesterification reaction that is superior in 1,3-position specificity include immobilized lipase derived from Rhizomucor miehei (Lipozyme TLIM, Lipozyme RMIM etc., manufactured by Novozymes), and the like.

The enzymatic transesterification reaction may be carried out by, for example, adding lipase powder or immobilized lipase to a raw fat material in an amount of 0.02 to 10% by mass and preferably 0.04 to 5% by mass, and thereafter stirring the mixture at 40 to 80° C. and preferably 40 to 70° C. for 0.5 to 48 hrs and preferably 0.5 to 24 hrs. After completing the transesterification reaction, the lipase powder or immobilized lipase is removed by filtration or the like, and thereafter decolorization and deodorization treatments may be carried out which are employed in common purification steps of cooking oil.

According to one preferred embodiment of the hard fat of the present invention, the hard fat is obtained by mixing the aforementioned fat A and the aforementioned fat B at the mixing ratio in the range of 30:70 to 75:25 so as to give the triglyceride constitution essential for the hard fat of the present invention as described above. Also, a fat other than the fat A and the fat B may be mixed in the range that enables the triglyceride constitution essential for the hard fat of the present invention to be achieved; however, the amount of the other fat blended is preferably 0 to 30% by mass, and more preferably 0 to 20% by mass.

The present invention involves a fat/oil composition containing the hard fat and the liquid fat/oil.

The liquid fat/oil herein referred to means a fat/oil that has a lauric acid content of less than 5% by mass as a constituent fatty acid and that exhibits fluidity at an ordinary temperature (25° C.) Examples of such a liquid fat/oil include fats/oils constituted with at least one selected from soybean oil, rape seed oil, cotton seed oil, corn oil, sunflower oil, safflower oil, sesame oil, rice oil, olive oil, palm oil, peanut oil and linseed oil, and processed oils such as hydrogenated oils of each of the single oil or a mixed oil, transesterified oils obtained by subjecting each of the single oil or a mixed oil to a transesterification reaction, and fractionated oils of each of the single oil or mixed oil, and the like. The liquid fat/oil exhibits fluidity at 25° C., preferably at 20° C., and more preferably at 15° C.

According to one preferred embodiment, the liquid fat/oil is a vegetable oil/fat which is generally referred to as "salad oil" and preferably has cold resistance to an extent that shows clearness (transparency) at 0° C. for 5 hrs or longer according to a cooling test (Standard Test Method for Analysis of Fats and Oils, 2.2.8.1-1996, Cooling Test (No. 1)). Another preferred embodiment is exemplified by a mixed oil of the aforementioned vegetable fat/oil with a palm olein or a transesterified oil thereof having an iodine value of no less than 55 at a mass ratio of 40:60 to 90:10. Still another preferred embodiment is exemplified by a mixed fat/oil at a ratio of 40:60 to 90:10 of the aforementioned vegetable fat/oil with a mixed fat/oil of a transesterified oil of a palm olein having an iodine value of no less than 55 and a palm mid fraction at a mass ratio of 70:30 to 0:100, and preferably 60:30 to 20:80.

The proportion of the trans fatty acids in the entire constituent fatty acids of the hard fat of the present invention, and the fat/oil composition constituted with the hard fat and a liquid fat/oil is required to be less than 5% by mass, preferably less than 3% by mass, more preferably less than 2% by mass, and even more preferably less than 1% by mass for the purpose of avoiding to substantially contain trans fatty acids which are reportedly not favorable to health.

It should be noted that the analysis of the constituent fatty acid and the analysis of the trans fatty acid can be performed in accordance with AOCS Celf-96 with a gas chromatography process.

The fat/oil composition of the present invention is a fat/oil composition prepared by mixing the hard fat described above with the liquid fat/oil described above at a mass ratio of 10:90 to 90:10. In particular, by using the fat/oil composition of the present invention as an oil phase of a margarine or shortening, the margarine or shortening of the present invention is obtained having favorable plasticity and favorable meltability in the mouth accompanied by feel of coolness of the lauric fat.

The margarine or shortening of the present invention has a content of the oil phase of preferably 50 to 100% by mass, more preferably 60 to 98% by mass, and still more preferably, 70 to 98% by mass. Also, it has a content of an aqueous phase of preferably 0 to 50% by mass, more preferably 2 to 40% by mass, and still more preferably 2 to 30% by mass. In general, when the aqueous phase is absent, the compositions are referred to as shortenings, while referred to as margarines when the aqueous phase is included. When the content of the oil phase and the aqueous phase falls within the above range, the resulting margarine can retain its emulsification state more favorably.

The margarine or shortening of the present invention may contain a component other than those described in the foregoing. Examples of the other component include an emulsifying agent, a thickening stabilizer, a salting agent such as common salts and potassium chloride, an acidulant such as acetic acid, lactic acid and gluconic acid, a sweetener such as saccharide, sugar alcohols, stevia and aspartame, a colorant such as β-carotene, caramel and monascus color, an antioxidant such as tocopherol and tea extract, a plant protein such as wheat protein and soybean protein, egg and various egg processed egg product, a flavor, a milk product, a seasoning, a pH adjusting agent, a food preservative, and an ingredient for foods or a food additive such as fruit, fruit juice, coffee, nuts paste, spices, cocoa mass, cocoa powder, grain, beans, vegetables, meats and fish and shellfish, and the like.

Examples of the emulsifying agent include synthetic emulsifying agents such as polyglycerin fatty acid esters, sucrose fatty acid esters, sorbitan fatty acid esters, polysorbate, condensed ricinoleic fatty acid esters and glyceride esters, as well as emulsifying agents other than synthetic agents such as soybean lecithin, egg yolk lecithin, soybean lysolecithin, egg yolk lysolecithin, enzyme-treated egg yolk, saponin, plant sterols and milk fat globule membrane, and the like.

Examples of the thickening stabilizer include guar gum, locust bean gum, carrageen, gum arabic, alginic acids, pectin, xanthan gum, pullulan, tamarind seed gum, psylium seed gum, crystal cellulose, carboxymethyl cellulose, methyl cellulose, agar, glucomannan, gelatin, starch, processed starch, and the like.

In the margarine or shortening of the present invention, the content of the other component described above is preferably no greater than 10% by mass, and more preferably no greater than 5% by mass.

Next, a method for producing the margarine or shortening of the present invention will be explained.

The method for producing the margarine or shortening of the present invention is not particularly limited, and can be obtained by lysing the oil phase in which the fat/oil component is constituted with the fat/oil composition of the present invention, and cooling to permit crystallization. Specifically, the oil phase is first lysed, and the aqueous phase is mixed to permit emulsification as needed. Then, carrying out a sterilization process subsequently is desired. The sterilization process may be either of batch wise in a tank, or continuous using a plate type heat exchanger or a scraped surface heat exchanger.

Next, cooling is carried out to permit crystallization. Preferably, cooling is carried out to permit plasticization. The cooling conditions involve cooling at a rate of preferably no less than −0.5° C./min, and more preferably no less than −5° C./min. In this step, it is more preferred to carry out the cooling quickly rather than gradually.

The cooling may be carried out with a cooling system which may be a sealed continuous tubular cooling device, for example, a margarine manufacturing machine such as a votator, combinator or perfector, a plate type heat exchanger or the like. Alternatively, any combination of an open type "Dia-Cooler" with "Complector" may be employed.

The fat/oil composition of the present invention does not substantially contain trans fatty acid as described above. Therefore, the margarine or shortening in which the fat/oil component is constituted with the fat/oil composition of the present invention does not substantially contain trans fatty acid.

When a margarine is produced using the fat/oil composition of the present invention, its emulsification state may be any one of water-in-oil type, oil-in-water type, and double emulsifying type.

One preferred embodiment of the margarine or shortening in which the fat/oil composition of the present invention is used is exemplified by a spread, particularly a fat spread produced by emulsification to give a water-in-oil type constituted with 65 to 75% by mass of an oil phase and 35 to 25% by mass of a water phase. When used as the oil phase of the fat spread, the mixing ratio of the hard fat to the liquid fat/oil (mass basis) is preferably 10:90 to 50:50, more preferably 15:85 to 40:60, and most preferably 20:80 to 35:65. The mixing ratio of the hard fat to the liquid fat/oil (mass basis) falling within the above range is preferred since a fat spread can be obtained which has favorable texture even when getting in and out a refrigerator, and also has favorable plasticity and favorable meltability in the mouth accompanied by feel of coolness.

Still another preferred embodiment of the margarine or shortening in which the fat/oil composition of the present invention is used is exemplified by a roll-in margarine constituted with 65 to 95% by mass of an oil phase and 35 to 5% by mass of a water phase. When used as the oil phase of the roll-in margarine, the mixing ratio of the hard fat to the liquid fat/oil (mass basis) is preferably 25:75 to 65:35, more preferably 35:65 to 60:40, and most preferably 45:55 to 55:45. When the mixing ratio of the hard fat to the liquid fat/oil (mass basis) falls within the above range, a roll-in margarine can be produced which has favorable spreadability in a broad temperature range of operation, and also provides a light mouthfeel and favorable meltability in the mouth even when the water phase is included at a comparatively high proportion of no less than 25% by mass.

Examples of the foods in which the margarine or shortening of the present invention is used include breads such as white loaf bread, sweetened buns, crescent rolls and Danish pastries, baked confectioneries such as cookies, biscuits, cakes and pies, and the like. Examples of the foods in which the shortening of the present invention is used include breads such as white loaf bread, sweetened buns, crescent rolls and Danish pastries, baked confectioneries such as cookies, biscuits, cakes and pies, and the like.

EXAMPLES

Next, the present invention is explained in more detail by way of Examples, but the present invention is not any how limited thereto.

[Preparation of Test Fat/Oil]

1. Preparation of Fat A

A-1: Coconut oil (trade name: purified coconut oil; lauric acid content: 48.0% by mass; iodine value: 8.6, manufactured by Nisshin OilliO Group, Ltd.)

A-2: Palm kernel oil (lauric acid content: 46.5% by mass; iodine value: 18.7, manufactured in-company by Nisshin OilliO Group, Ltd.)

A-3: Palm kernel oil transesterified oil (lauric acid content: 46.2% by mass; iodine value: 18.5, prepared by chemical transesterification using sodium methylate as a catalyst)

2. Preparation of Fat B

B-1: Transesterified lipid 1 (transesterified lipid prepared by mixing 50 parts by mass of a fully hydrogenated oil of palm kernel oil and 50 parts by mass of a fully hydrogenated oil of palm oil, and subjecting to chemical transesterification with sodium methylate as a catalyst; lauric acid content: 21.9% by mass; content of saturated fatty acids having 16 or more carbon atoms: 65.8% by mass; iodine value: 0.3)

B-2: Transesterified lipid 2 (transesterified lipid prepared by mixing 40 parts by mass of a fractionated hard portion of palm kernel oil (iodine value: 6.9) and 60 parts by mass of a palm oil 2-step fractionated hard portion (iodine value: 12.5), and subjecting to chemical transesterification with sodium methylate as a catalyst; lauric acid content: 22.4% by mass; content of saturated fatty acids having 16 or more carbon atoms: 55.5% by mass; iodine value: 10.3)

B-3: Transesterified lipid 3 (transesterified lipid prepared by mixing 60 parts by mass of a fully hydrogenated oil of coconut oil and 40 parts by mass of a fully hydrogenated oil of palm oil, and subjecting to chemical transesterification with sodium methylate as a catalyst; lauric acid content: 28.8% by mass; content of saturated fatty acids having 16 or more carbon atoms: 52.4% by mass; iodine value: 0.2)

3. Preparation of Liquid Fat/Oil

Liquid fat/oil 1: rape seed oil (trade name: Natane Shirashime-yu; lauric acid content: 0% by mass; maintains clarity at 0° C. for 5 hrs, manufactured by Nisshin OilliO Group, Ltd.)

Liquid fat/oil 2: (mixed fat/oil prepared by mixing 80 parts by mass of a rape seed oil with 20 parts by mass of a transesterified lipid obtained by chemical transesterification of a palm olein (iodine value: 56) using sodium methylate as a catalyst; lauric acid content: 0% by mass, fluid at 15° C.)

Liquid fat/oil 3: (mixed fat/oil prepared by mixing 80 parts by mass of a rape seed oil, 10 parts by mass of a transesterified lipid obtained by chemical transesterification of a palm olein (iodine value: 56) using sodium methylate as a catalyst, and 10 parts by mass of a palm oil mid fraction (iodine value: 45); lauric acid content: 0% by mass, fluid at 15° C.)

4. Preparation of Other Fat/Oil

Fully hydrogenated oil of soybean oil (trade name: soybean fully hydrogenated oil; lauric acid content: 0% by mass; content of saturated fatty acids having 16 or more carbon atoms: 99.7% by mass; iodine value: 0.2; manufactured by Yokozeki Oil & Fat Industries Co., Ltd.)

[Preparation of Hard Fat 1]

According to fat/oil blend compositions shown in Table 1, hard fats were prepared (hard fat Nos. 1 to 8). In addition, the lauric acid content, the iodine value, and the content and the constituent ratio of each triglyceride fraction of the prepared hard fat are shown in the same Table 1.

[Preparation and Evaluation of Fat Spread 1]

According to blend compositions of oil phases that constitute the fat spreads shown in Table 1, each hard fat (hard fat Nos. 1 to 8) was mixed with the liquid fat/oil 1 to produce a fat for blending in the oil phase of the fat spread.

The oil phase and the water phase were prepared according to the following blend compositions, and rapid cooling/mixing was carried out with ONLATOR according to a routine method to obtain a water-in-oil type fat spread for each fat prepared by mixing each hard fat (hard fat Nos. 1 to 8) with the liquid fat/oil. Thus obtained fat spread was evaluated on the meltability in the mouth, the shape retainability, and the structural state in accordance with the following criteria. The evaluation results are shown in the same Table 1 (Examples 1 to 4, and Comparative Examples 1 to 4).

(Composition of Fat Spread)

Oil phase: fat 70%, emulsifying agent 0.5% (glycerin monofatty acid ester 0.1%, soybean lecithin 0.4%), and flavor (butter flavor) 0.1%

Water phase: water 27.4%, salt 1%, and powdered skim milk 1%

(Evaluation of Fat Spread)

(1) Meltability in the Mouth

Evaluation was carried out by a sensory test according to the following three-point scale.

A: very favorable with meltability in the mouth accompanied by feel of coolness

B: ordinary

C: unfavorable with unmelted solids remaining in the mouth (2) Evaluation of Shape Retainability The fat spread which had been stored while refrigerating was evaluated on the state after leaving to stand at 30° C. for 15 hrs, according to the following three-point scale.

A: favorable with less seeping of the liquid oil found

B: seeping of the liquid oil found to some extent, but retaining shape

C: entirely melting and loosing shape (3) Evaluation of Structural State

The surface condition of the fat spread was visually observed, and evaluated according to the following three-point scale.

A: glossy and smooth

B: ordinary

C: neither glossy nor smooth

TABLE 1

|  |  | Comparative Example 1 | Comparative Example 2 | Example 1 | Example 2 |
|---|---|---|---|---|---|
| hard fat | hard fat No. | 1 | 2 | 3 | 4 |
|  | fat A-1 | 100% | 80.6% | 71.6% | 58.6% |
|  | fat B-1 | — | 19.4% | 28.6% | 41.4% |
|  | fully hydrogenated oil of soybean oil | — | — | — | — |
|  | lauric acid content | 48.0% | 42.9% | 40.6% | 37.2% |
|  | iodine value | 8.6 | 7.0 | 6.2 | 5.2 |
|  | CN32-54 | 95.8% | 96.3% | 96.6% | 96.9% |
|  | CN32-38 | 63.1% | 53.3% | 48.6% | 42.1% |
|  | CN40-46 | 25.8% | 29.8% | 31.7% | 34.3% |
|  | CN48-54 | 6.9% | 13.2% | 16.3% | 20.5% |
|  | CN32-38/CN40-46 | 2.4 | 1.8 | 1.5 | 1.2 |
|  | CN32-38/CN48-54 | 9.2 | 4.0 | 3.0 | 2.1 |
|  | CN40-46/CN48-54 | 3.8 | 2.3 | 1.9 | 1.7 |
| spread | fat — each hard fat | 50% | 35% | 35% | 30% |
|  | liquid oil 1 | 50% | 65% | 65% | 70% |
|  | evaluation — meltability in the mouth | A | A | A | A |
|  | shape retainability | C | C | B | A |
|  | structural state | C | B | B | A |

|  |  | Example 3 | Example 4 | Comparative Example 3 | Comparative Example 4 |
|---|---|---|---|---|---|
| hard fat | hard fat No. | 5 | 6 | 7 | 8 |
|  | fat A-1 | 45.9% | 36.8% | 25.4% | 73.9% |
|  | fat B-1 | 54.1% | 63.2% | 74.6% | — |
|  | fully hydrogenated oil of soybean oil | — | — | — | 26.1% |
|  | lauric acid content | 33.9% | 31.5% | 28.5% | 35.4% |
|  | iodine value | 4.1 | 3.4 | 2.4 | 6.4 |
|  | CN32-54 | 97.1% | 97.4% | 97.7% | 96.2% |
|  | CN32-38 | 35.6% | 31.0% | 25.1% | 46.6% |
|  | CN40-46 | 36.9% | 38.8% | 41.2% | 19.1% |
|  | CN48-54 | 24.6% | 27.6% | 31.4% | 30.5% |
|  | CN32-38/CN40-46 | 1.0 | 0.8 | 0.6 | 2.4 |
|  | CN32-38/CN48-54 | 1.4 | 1.1 | 0.8 | 1.5 |
|  | CN40-46/CN48-54 | 1.5 | 1.4 | 1.3 | 0.6 |
| spread | fat — each hard fat | 23% | 20% | 17% | 23% |
|  | liquid oil 1 | 77% | 80% | 83% | 77% |
|  | evaluation — meltability in the mouth | A | B | C | C |
|  | shape retainability | A | A | B | B |
|  | structural state | A | A | A | C |

"%" in Table representing "% by mass"

[Preparation of Hard Fat 2]

According to fat/oil blend compositions shown in Table 2, hard fats were prepared (hard fat Nos. 9 to 12). In addition, the lauric acid content, the iodine value, and the content and the constituent ratio of each triglyceride fraction of the prepared hard fat are shown in the same Table 2.

[Preparation and Evaluation of Fat Spread 2]

According to blend compositions of oil phases that constitute the fat spreads shown in Table 2, each hard fat (hard fat Nos. 9 to 12) was mixed with the liquid fat/oils 1-3 to produce a fat for blending in the oil phase of the fat spread.

The oil phase and the water phase were prepared in similar blend compositions in [Preparation and Evaluation of Fat Spread 1], and rapid cooling/mixing was carried out with ONLATOR according to a routine method to obtain a water-in-oil type fat spread for each fat prepared by mixing each hard fat (hard fat Nos. 9 to 12) with the liquid fat/oils 1-3. Thus obtained fat spread was evaluated on the meltability in the mouth, the shape retainability, and the structural state in accordance with the criteria similar to those in [Preparation of Fat Spread and evaluation 1] The evaluation results are shown in the same Table 2 (Examples 5 to 9, and Comparative Example 5).

TABLE 2

|  |  | Example 5 | Example 6 | Example 7 |
|---|---|---|---|---|
|  | hard fat No. | 9 | 10 | 11 |
| hard fat | A-1 | 58.6% | — | — |
|  | A-2 | — | 66.7% | — |
|  | A-3 | — | — | 66.7% |
|  | B-1 | — | 33.3% | 33.3% |
|  | B-2 | 41.4% | — | — |
|  | lauric acid content | 37.4% | 38.3% | 38.1% |
|  | iodine value | 9.3 | 12.6 | 12.4 |
|  | CN32-54 | 97.3% | 97.9% | 98.7% |
|  | CN32-38 | 40.4% | 37.9% | 32.5% |
|  | CN40-46 | 40.4% | 36.9% | 47.7% |
|  | CN48-54 | 16.5% | 23.1% | 18.5% |
|  | CN32-38/CN40-46 | 1.0 | 1.0 | 0.7 |
|  | CN32-38/CN48-54 | 2.4 | 1.6 | 1.8 |
|  | CN40-46/CN48-54 | 2.4 | 1.6 | 2.6 |

TABLE 2-continued

| | | | | | |
|---|---|---|---|---|---|
| spread | fat | each hard fat | 33% | 33% | 33% |
| | | liquid oil 1 | 67% | 67% | 67% |
| | | liquid oil 2 | — | — | — |
| | | liquid oil 3 | — | — | — |
| | evaluation | meltability in the mouth | A | A | B |
| | | shape retainability | A | A | A |
| | | structural state | A | B | A |

| | | | Comparative Example 5 | Example 8 | Example 9 |
|---|---|---|---|---|---|
| hard fat | hard fat No. | | 12 | 9 | 11 |
| | | A-1 | — | 58.6% | — |
| | | A-2 | — | — | — |
| | | A-3 | 33.3% | — | 66.7% |
| | | B-1 | 66.7% | — | 33.3% |
| | | B-2 | — | 41.4% | — |
| | lauric acid content | | 30.0% | 37.4% | 38.1% |
| | iodine value | | 6.4 | 9.3 | 12.4 |
| | CN32-54 | | 98.4% | 97.3% | 98.7% |
| | CN32-38 | | 20.9% | 40.4% | 32.5% |
| | CN40-46 | | 46.9% | 40.4% | 47.7% |
| | CN48-54 | | 30.6% | 16.5% | 18.5% |
| | CN32-38/CN40-46 | | 0.4 | 1.0 | 0.7 |
| | CN32-38/CN48-54 | | 0.7 | 2.4 | 1.8 |
| | CN40-46/CN48-54 | | 1.5 | 2.4 | 2.6 |
| spread | fat | each hard fat | 20% | 28% | 28% |
| | | liquid oil 1 | 80% | — | — |
| | | liquid oil 2 | — | 72% | — |
| | | liquid oil 3 | — | — | 72% |
| | evaluation | meltability in the mouth | C | A | A |
| | | shape retainability | A | A | A |
| | | structural state | A | A | A |

"%" in Table representing "% by mass"

[Preparation of Hard Fat 3]

According to fat/oil blend compositions shown in Table 3, each hard fat was prepared (hard fat Nos. 5 and 13).

In addition, the lauric acid content, the iodine value, and the content and the constituent ratio of each triglyceride fraction of the prepared hard fat are shown in the same Table 3.

[Preparation and Evaluation of Roll-in Margarine]

According to blend compositions of oil phases that constitute the roll-in margarines shown in Table 3, hard fat No. 5 or No. 13 was mixed with the liquid fat/oil 1 to produce a fat for blending in the oil phase of the roll-in margarine.

The oil phase and the water phase were prepared according to the following blend compositions, and rapid cooling/mixing was carried out with a combinator according to a routine method, followed by molding into a sheet form by passing through a resting tube to obtain a water-in-oil type roll-in margarine for hard fat No. 5 or No. 13 with the liquid fat/oil 1. A croissant was produced by way of trial using thus obtained roll-in margarine according to the following blend composition and procedure, and evaluated on the spreadability, the lift of the pastry dough and the texture in accordance with the following criteria. The evaluation results are shown in the same Table 3 (Example 10, and Comparative Example 6).

(Composition of Roll-In Margarine)

Oil phase: fat 94%, emulsifying agent 0.4% (glycerin monofatty acid ester 0.3%, soybean lecithin 0.1%), and flavor (butter flavor) 0.1%

Water phase: water 5%, and salt 0.5%

(Blend Composition and Production by Way of Trial of Croissant)

A dough was produced in accordance with the blend composition shown below, and stored at −5° C. When this dough was cooled to 0° C., 500 g of the roll-in margarine relative to dough 1,787 g (corresponding to 1 kg of the powder) was used in folding the dough into three twice, and the folded dough was stored at 0° C. for 120 min. Thereafter, the dough was again folded into three, followed by storing at 0° C. for 90 min. This dough was spread using a sheeter, and formed by cutting into an isosceles triangle having a base of 12 cm and a height of 15 cm. Fermentation of the formed dough was allowed as a final proof at 32° C. and a humidity of 75%, followed by baking in an oven at 215° C. for 17 min.

Dough blend composition of the croissant (relative % ratio provided that the total amount of hard wheat flour and all-purpose flour was 100%)

Hard wheat flour 30%, all-purpose flour 70%, sugar 6%, whole egg 5%, powdered skim milk 3%, salt 1.7%, margarine for kneading 6%, yeast 4%, water 53%

(Handling Characteristic and Tasting Evaluation)

(1) Evaluation of Spreadability

Spreadability of the margarine when spread with a sheeter was evaluated according to the following three-point scale.

A: satisfactorily spreadable and favorable
B: ordinary
C: cracks generated and being unfavorable (2) Evaluation of Pastry Dough Lift The produced croissant was sliced to give a cross section and the appearance (internal layers and volume) was visually observed, and evaluated according to the following three-point scale.

A: internal layers distinctly separated, and being voluminous and favorable
B: ordinary
C: internal layer collapsed, and being less voluminous (3) Evaluation of Texture Evaluation was carried out by a sensory test according to the following three-point scale.

A: not remaining in the mouth and favorable
B: ordinary
C: remaining in the mouth and unfavorable

TABLE 3

| | | | Example 10 | Comparative Example 6 |
|---|---|---|---|---|
| hardfat | hard fat No. | | 5 | 13 |
| | A-1 | | 45.9% | — |
| | B-1 | | 54.1% | — |
| | B-3 | | — | 100% |
| | lauric acid content | | 33.9% | 28.8% |
| | iodine value | | 4.1 | 0.3 |
| | CN32-54 | | 97.1% | 98.9% |
| | CN32-38 | | 35.6% | 22.5% |
| | CN40-46 | | 36.9% | 54.7% |
| | CN48-54 | | 24.6% | 21.7% |
| | CN32-38/CN40-46 | | 1.0 | 0.4 |
| | CN32-38/CN48-54 | | 1.4 | 1.0 |
| | CN40-46/CN48-54 | | 1.5 | 2.5 |
| roll-in | fat | hardfat | 50% | 40% |
| | | liquid oil 1 | 50% | 60% |
| | evaluation | spreadability | A | A |
| | | pastry dough lift | A | B |
| | | texture | A | B |

"%" in Table representing "% by mass"

INDUSTRIAL APPLICABILITY

Preparation of a margarine or shortening using the hard fat of the present invention enables a margarine or shortening having favorable meltability in the mouth, being superior in shape retainability and structural state (texture), and having favorable plasticity to be obtained. In addition, by using the hard fat of the present invention in an application such as spreading or rolling-in, a spread having favorable meltability in the mouth accompanied by feel of coolness as well as favorable shape retainability and structural state (texture), and a roll-in margarine having good spreadability and favorable lift of the pastry dough can be produced. Accordingly, pies, Danish pastries and croissants using the same having light texture and favorable meltability in the mouth can be provided.

The invention claimed is:

1. A hard fat comprising 25 to 45% by mass of a lauric acid, having an iodine value of 0 to 25, and having the following triglyceride composition:
    triglycerides having a total number of carbon atoms of the constituent fatty acid residues of 32 to 54 (CN 32 to 54 TG) being 85 to 100% by mass;
    triglycerides having a total number of carbon atoms of the constituent fatty acid residues of 32 to 38 (CN 32 to 38 TG) being 30 to 50% by mass;
    triglycerides having a total number of carbon atoms of the constituent fatty acid residues of 40 to 46 (CN 40 to 46 TG) being 25 to 55% by mass; and
    triglycerides having a total number of carbon atoms of the constituent fatty acid residues of 48 to 54 (CN 48 to 54 TG) being 10 to 30% by mass,
    the mass ratio of the triglycerides having a total number of carbon atoms of the constituent fatty acid residues of 32 to 38 to the triglycerides having a total number of carbon atoms of the constituent fatty acid residues of 40 to 46 ((CN 32 to 38 TG)/(CN 40 to 46 TG)) being 0.5 to 1.5;
    the mass ratio of the triglycerides having a total number of carbon atoms of the constituent fatty acid residues of 32 to 38 to the triglycerides having a total number of carbon atoms of the constituent fatty acid residues of 48 to 54 ((CN 32 to 38 TG)/(CN 48 to 54 TG)) being no less than 1.0;
    the mass ratio of the triglycerides having a total number of carbon atoms of the constituent fatty acid residues of 40 to 46 to the triglycerides having a total number of carbon atoms of the constituent fatty acid residues of 48 to 54 ((CN 40 to 46 TG)/(CN 48 to 54 TG)) being no less than 1.0; and
    the hard fat being prepared by mixing a fat A: a lauric fat comprising 35 to 65% by mass of lauric acid and having an iodine value of 0 to 30 with a fat B: a transesterified lipid that comprises 12 to 34% by mass of lauric acid and 45 to 75% by mass of a saturated fatty acid having 16 or more carbon atoms and has an iodine value of 0 to 20, the mixing ratio of the fat A to the fat B being 30:70 to 75:25.

2. The hard fat according to claim 1, wherein the fat A which is a lauric fat comprising 35 to 65% by mass of lauric acid and having an iodine value of 0 to 30 is a fat/oil derived from coconut oil.

3. The hard fat according to claim 1, wherein the fat A which is a lauric fat comprising 35 to 65% by mass of lauric acid and having an iodine value of 0 to 30 is a transesterified lipid.

4. A fat/oil composition prepared by mixing the hard fat according to claim 1 with a liquid fat/oil at a ratio of 10:90 to 90:10.

5. A margarine or shortening comprising the fat/oil composition according to claim 4 as an oil phase.

6. The margarine or shortening according to claim 5 for use in spreading or rolling-in.

7. A food in which the margarine or shortening according to claim 5 is used.

* * * * *